United States Patent
Uejima

(10) Patent No.: US 12,341,542 B2
(45) Date of Patent: Jun. 24, 2025

(54) RADIO-FREQUENCY MODULE AND COMMUNICATION APPARATUS

(71) Applicant: Murata Manufacturing Co., Ltd., Kyoto (JP)

(72) Inventor: Takanori Uejima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 386 days.

(21) Appl. No.: 18/170,620

(22) Filed: Feb. 17, 2023

(65) Prior Publication Data

US 2023/0198554 A1    Jun. 22, 2023

Related U.S. Application Data

(63) Continuation of application No. PCT/JP2021/022067, filed on Jun. 10, 2021.

(30) Foreign Application Priority Data

Aug. 24, 2020  (JP) ................. 2020-140532

(51) Int. Cl.
*H04B 1/00* (2006.01)
*H04B 1/44* (2006.01)

(52) U.S. Cl.
CPC ............. *H04B 1/0064* (2013.01); *H04B 1/44* (2013.01)

(58) Field of Classification Search
CPC ...... H04B 1/0064; H04B 1/44; H04B 1/0057; H04B 1/006; H04B 1/18; H04B 1/38
See application file for complete search history.

(56) References Cited

U.S. PATENT DOCUMENTS

| | | | |
|---|---|---|---|
| 2015/0133067 A1 | 5/2015 | Chang et al. | |
| 2017/0005385 A1* | 1/2017 | Khlat | ............. H04B 1/006 |
| 2019/0334563 A1* | 10/2019 | Elbrecht | ........... H04B 1/0057 |

FOREIGN PATENT DOCUMENTS

| | | |
|---|---|---|
| JP | 2005-136883 A | 5/2005 |
| JP | 2006-310968 A | 11/2006 |

OTHER PUBLICATIONS

International Search Report for PCT/JP2021/022067 dated Sep. 7, 2021.

* cited by examiner

*Primary Examiner* — Ayodeji O Ayotunde
(74) *Attorney, Agent, or Firm* — McDonald Hopkins LLC

(57) ABSTRACT

A radio-frequency module includes multiple external connection terminals. The multiple external connection terminals include an antenna connection terminal connected to one end of a filter and another end of a filter, an antenna connection terminal connected to the one end of the filter, an antenna connection terminal connected to the other end of the filter, an antenna connection terminal connected to a duplexer and a transmission-reception filter via a switch, and an antenna connection terminal connected to a duplexer and a transmission-reception filter via the switch.

20 Claims, 7 Drawing Sheets

RADIO-FREQUENCY MODULE AND COMMUNICATION APPARATUS

CROSS REFERENCE TO RELATED APPLICATION

This is a continuation of International Application No. PCT/JP2021/022067 filed on Jun. 10, 2021 which claims priority from Japanese Patent Application No. 2020-140532 filed on Aug. 24, 2020. The contents of these applications are incorporated herein by reference in their entireties.

BACKGROUND ART

Technical Field

The present disclosure relates to a radio-frequency module and a communication apparatus.

In mobile communication devices, such as mobile phones, requests for radio-frequency modules are diversified. For example, in a radio-frequency module in Patent Document 1, connection of different communication band groups, such as a high band (HB) and a low band (LB), to different antennas is requested.

Patent Document 1: U.S. Patent Application Publication No. 2015/0133067

BRIEF SUMMARY

However, the requests for the radio-frequency modules are diversified and, for example, connection to an antenna common to multiple communication band groups via a multiplexer may be requested. In such a case, it is suitable to individually design and manufacture the product in accordance with the requests in the radio-frequency module in related art.

In order to resolve the above problem, the present disclosure provides a radio-frequency module and a communication apparatus, which are capable of commonly using the product.

A radio-frequency module according to an aspect of the present disclosure includes a first filter having a passband including a first communication band group; a second filter having a passband including a second communication band group different from the first communication band group; a third filter having a passband including a first communication band included in the first communication band group; a fourth filter having a passband including a second communication band, which is included in the first communication band group and which is different from the first communication band; a fifth filter having a passband including a third communication band included in the second communication band group; a sixth filter having a passband including a fourth communication band, which is included in the second communication band group and which is different from the third communication band; a switch to be connected to the third filter, the fourth filter, the fifth filter, and the sixth filter; multiple external connection terminals; and a module substrate having the first filter, the second filter, the third filter, the fourth filter, the fifth filter, the sixth filter, the switch, and the plurality of external connection terminals arranged thereon. The multiple external connection terminals include a first external connection terminal connected to one end of the first filter and one end of the second filter; a second external connection terminal connected to the other end of the first filter; a third external connection terminal connected to the other end of the second filter; a fourth external connection terminal connected to the third filter and the fourth filter via the switch; and a fifth external connection terminal connected to the fifth filter and the sixth filter via the switch.

According to the radio-frequency module according to an aspect of the present disclosure, it is possible to commonly use the product.

DETAILED DESCRIPTION

Figure 1:
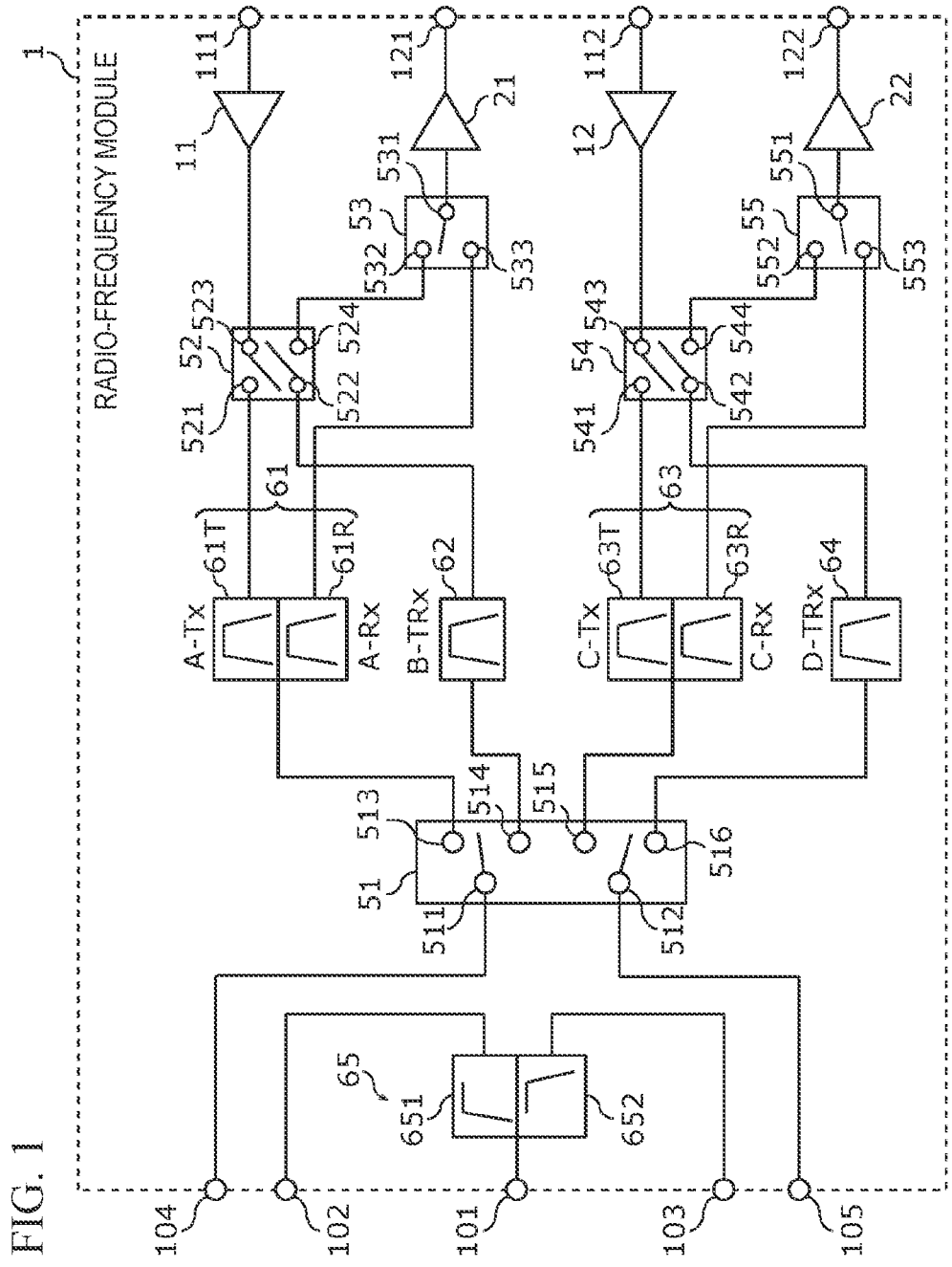
FIG. 1 is a diagram illustrating the circuit configuration of a radio-frequency module according to a first embodiment.

Embodiments of the present disclosure will herein be described in detail with reference to the drawings. All the embodiments described below indicate comprehensive or specific examples. Numerical values, shapes, materials, components, the arrangement of the components, the connection mode of the components, and so on, which are indicated in the embodiments described below, are only examples and are not intended to limit the present disclosure.

The respective drawings are schematic diagrams appropriately subjected to emphasis, omission, or adjustment of ratios in order to describe the present disclosure. The respective drawings are not necessarily strictly illustrated and may be different from the actual shapes, positional relationship, and ratios. The same reference numerals and letters are used in the respective drawings to identify substantially the same components and a duplicated description of such components may be omitted or simplified.

In the respective drawings described below, the x axis and the y axis are axes that are orthogonal to each other on a plane parallel to main surfaces of a module substrate. Specifically, when the module substrate has a rectangular shape in a plan view, the x axis is parallel to a first side of the module substrate and the y axis is parallel to a second side orthogonal to the first side of the module substrate. The z axis is an axis vertical to the main surfaces of the module substrate. The positive direction of the z axis indicates the upper direction and the negative direction thereof indicates the lower direction.

In the circuit configuration of the present disclosure, "connected" includes not only direct connection with a connection terminal and/or a wiring conductor but also electrical connection via another circuit element. "Directly connected" means direct connection with a connection terminal and/or a wiring conductor not via another circuit element. "Connected between A and B" means connection to both A and B between A and B.

In the arrangement of components of the present disclosure, the "distance between A and B" means the length of a line segment between a representative point in A and a representative point in B. Although the center point of an object, a point in one object closest to the other object, and so on can be used as the representative point here, the representative point is not limited to these points. The terms, such as parallel and vertical, indicating the relationship between elements; the terms, such as rectangles, indicating the shapes of the elements; and numerical ranges do not represent only strict meanings but mean inclusion of substantially the same ranges, for example, differences on the order of few percent.

"Arrangement of a component on a substrate" includes arrangement of the component above the substrate without necessarily being in contact with the substrate (for example, lamination of the component on another component arranged on the substrate) and embedding of part of the component or the entire component in the substrate, in addition to arrangement of the component on the substrate with being in contact with the substrate. In addition, "arrangement of a component on a main surface of a substrate" includes arrangement of the component above the main surface without necessarily being in contact with the main surface and embedding of part of the component in the substrate from the main surface side, in addition to arrangement of the component on the main surface with being in contact with the main surface of the substrate. "Arrangement of A between B and C" means passing of at least one line segment through A, among multiple line segments between an arbitrary point in B and an arbitrary point in C.

First Embodiment 1.1 Circuit Configuration of Radio-Frequency Module 1

The circuit configuration of a radio-frequency module 1 according to the present embodiment will be described with reference to FIG. 1. FIG. 1 is a diagram illustrating the circuit configuration of the radio-frequency module 1 according to a first embodiment.

As illustrated in FIG. 1, the radio-frequency module 1 includes power amplifiers 11 and 12, low noise amplifiers 21 and 22, switches 51 to 55, duplexers 61 and 63, transmission-reception filters 62 and 64, a diplexer 65, antenna connection terminals 101 to 105, radio-frequency input terminals 111 and 112, and radio-frequency output terminals 121 and 122.

The antenna connection terminals 101 to 105 are examples of first to fifth external connection terminals, respectively, and are used for connection to an antenna outside the radio-frequency module 1. In the radio-frequency module 1, the antenna connection terminal 101 is connected to one end of a filter 651 and one end of a filter 652. The antenna connection terminal 102 is connected to the other end of the filter 651 in the radio-frequency module 1. The antenna connection terminal 103 is connected to the other end of the filter 652 in the radio-frequency module 1. The antenna connection terminal 104 is connected to the duplexer 61 and the transmission-reception filter 62 via the switch 51 in the radio-frequency module 1. The antenna connection terminal 105 is connected to the duplexer 63 and the transmission-reception filter 64 via the switch 51 in the radio-frequency module 1.

Each of the radio-frequency input terminals 111 and 112 is an example of a seventh external connection terminal and is a terminal for receiving a radio-frequency transmission signal from the outside of the radio-frequency module 1. In the present embodiment, the radio-frequency input terminal 111 is a terminal for receiving transmission signals in communication bands A and B included in a communication band group X from a radio-frequency integrated circuit (RFIC) 3. The radio-frequency input terminal 112 is a terminal for receiving transmission signals in communication bands C and D included in a communication band group Y from the RFIC 3.

Each of the radio-frequency output terminals 121 and 122 is an example of a sixth external connection terminal and is a terminal for supplying a radio-frequency reception signal to the outside of the radio-frequency module 1. In the present embodiment, the radio-frequency output terminal 121 is a terminal for supplying reception signals in the communication bands A and B included in the communication band group X to the RFIC 3. The radio-frequency output terminal 122 is a terminal for supplying reception signals in the communication bands C and D included in the communication band group Y to the RFIC 3.

The power amplifier 11 is capable of amplifying the transmission signals in the communication bands A and B received through the radio-frequency input terminal 111. Here, an input of the power amplifier 11 is connected to the radio-frequency input terminal 111 and an output of the power amplifier 11 is connected to the switch 52.

The power amplifier 12 is capable of amplifying the transmission signals in the communication bands C and D received through the radio-frequency input terminal 112. Here, an input of the power amplifier 12 is connected to the radio-frequency input terminal 112 and an output of the power amplifier 12 is connected to the switch 54.

The configuration of each of the power amplifiers 11 and 12 is not particularly restricted. For example, the power amplifier 11 and/or 12 may have a single-stage configuration or a multistage configuration. For example, the power amplifier 11 and/or 12 may include multiple amplifier elements that are cascade-connected to each other. The power amplifier 11 and/or 12 may convert a radio-frequency signal into a differential signal (that is, complementary signal) for amplification. The power amplifier 11 and/or 12 may be called a differential amplifier.

The low noise amplifier 21 is capable of amplifying the reception signals in the communication bands A and B. The reception signals in the communication bands A and B, which are amplified by the low noise amplifier 21, are supplied to the radio-frequency output terminal 121.

The low noise amplifier 22 is capable of amplifying the reception signals in the communication bands C and D. The reception signals in the communication bands C and D, which are amplified by the low noise amplifier 22, are supplied to the radio-frequency output terminal 122.

The configuration of each of the low noise amplifiers 21 and 22 is not particularly restricted. For example, the low noise amplifier 21 and/or 22 may have either of the single-stage configuration and the multistage configuration and may be a differential amplifier.

The duplexer 61 is an example of a third filter and has a passband including the communication band A. The duplexer 61 transmits the transmission signal and the reception signal in the communication band A using a frequency division duplex (FDD) method. The duplexer 61 includes a transmission filter 61T and a reception filter 61R.

The transmission filter 61T (A-Tx) has a passband including an uplink operating band of the communication band A. One end of the transmission filter 61T is connected to the antenna connection terminal 104 via the switch 51. The other end of the transmission filter 61T is connected the output of the power amplifier 11 via the switch 52.

The reception filter 61R (A-Rx) has a passband including a downlink operating band of the communication band A. One end of the reception filter 61R is connected to the antenna connection terminal 104 via the switch 51. The other end of the reception filter 61R is connected to an input of the low noise amplifier 21 via the switch 53.

The uplink operating band is part of the communication band and means part specified for uplink. The uplink operating band may be called a transmission band. The downlink operating band is part of the communication band and means part specified for downlink. The downlink operating band may be called a reception band.

The transmission-reception filter 62 (B-TRx) is an example of a fourth filter and has a passband including the communication band B. The transmission-reception filter 62 transmits the transmission signal and the reception signal in the communication band B using a time division duplex (TDD) method. One end of the transmission-reception filter 62 is connected to the antenna connection terminal 104 via the switch 51. The other end of the transmission-reception filter 62 is connected to the output of the power amplifier 11 via the switch 52 and is connected to the input of the low noise amplifier 21 via the switches 52 and 53.

The duplexer 63 is an example of a fifth filter and has a passband including the communication band C. The duplexer 63 transmits the transmission signal and the reception signal in the communication band C using the FDD method. The duplexer 63 includes a transmission filter 63T and a reception filter 63R.

The transmission filter 63T (C-Tx) has a passband including an uplink operating band of the communication band C. One end of the transmission filter 63T is connected to the antenna connection terminal 105 via the switch 51. The other end of the transmission filter 63T is connected the output of the power amplifier 12 via the switch 54.

The reception filter 63R (C-Rx) has a passband including a downlink operating band of the communication band C. One end of the reception filter 63R is connected to the antenna connection terminal 105 via the switch 51. The other end of the reception filter 63R is connected to an input of the low noise amplifier 22 via the switch 55.

The transmission-reception filter 64 (D-TRx) is an example of a sixth filter and has a passband including the communication band D. The transmission-reception filter 64 transmits the transmission signal and the reception signal in the communication band D using the TDD method. One end of the transmission-reception filter 64 is connected to the antenna connection terminal 105 via the switch 51. The other end of the transmission-reception filter 64 is connected to the output of the power amplifier 12 via the switch 54 and is connected to the input of the low noise amplifier 22 via the switches 54 and 55.

The diplexer 65 includes the two filters 651 and 652 each having the two passbands. The passbands of the two filters 651 and 652 are different from each other. In the diplexer 65, the filters 651 and 652 are tied to be connected to one antenna connection terminal 101.

The filter 651 is an example of a first filter and has a passband including the communication band group X. In other words, the filter 651 passes the signals in the respective communication bands included in the communication band group X. One end of the filter 651 is connected to the antenna connection terminal 101 and the other end of the filter 651 is connected to the antenna connection terminal 102.

The filter 652 is an example of a second filter and has a passband including the communication band group Y. In other words, the filter 652 passes the signals in the respective communication bands included in the communication band group Y. One end of the filter 652 is connected to the antenna connection terminal 101 and the other end of the filter 652 is connected to the antenna connection terminal 103.

The communication band group means a frequency range including multiple communication bands. The communication band means a frequency band defined in advance for a communication system by standards bodies or the likes (for example, 3rd Generation Partnership Project (3GPP) and Institute of Electrical and Electronics Engineers (IEEE)). The communication system means a communication system that is built using a radio access technology (RAT).

Although, for example, an ultra-high band group (3,300 MHz to 5,000 MHz), a high band group (2,300 MHz to 2,690 MHz), a middle band group (1,427 MHz to 2,200 MHz), a low band group (698 MHz to 960 MHz), and so on may be used as the communication band groups, the communication band groups are not limited to the above groups. For example, a communication band group including an unlicensed band of 5 GHz or higher or a communication band group in a millimeter band may be used as the communication band group.

Although, for example, a 5th Generation New Radio (5G NR) system, a Long Term Evolution (LTE) system, and a Wireless Local Area Network (WLAN) system may be used as the communication system, the communication system is not limited to these systems.

The communication band group X is an example of a first communication band group. Although, for example, the high band group may be used as the communication band group X, the communication band group X is not limited to this.

The communication band group Y is an example of a second communication band group and is lower than the communication band group X. Although, for example, the middle band group may be used as the communication band group Y, the communication band group Y is not limited to this.

The communication band A is an example of a first communication band and is included in the communication band group X. In the present embodiment, a communication band for frequency division duplex (FDD) is used as the communication band A. More specifically, although at least one of Band7 for LTE and n7 for 5GNR may be used as the communication band A, the communication band A is not limited to these bands.

The communication band B is an example of a second communication band. The communication band B is included in the communication band group X but is different from the communication band A. In the present embodiment, a communication band for time division duplex (TDD) is used as the communication band B. More specifically, although at least one of Band41 and Band40 for the LTE and n41 and n40 for the 5GNR may be used as the communication band B, the communication band B is not limited to these bands.

The communication band C is an example of a third communication band and is included in the communication band group Y. In the present embodiment, a communication band for the FDD is used as the communication band C. More specifically, although at least one of Band1, Band25, Band3, and Band66 for the LTE and n1, n25, n3, and n66 for the 5GNR may be used as the communication band C, the communication band C is not limited to these bands.

The communication band D is an example of a fourth communication band. The communication band D is included in the communication band group Y but is different from the communication band C. In the present embodiment, a communication band for the TDD is used as the communication band D. More specifically, although at least one of Band34 and Band39 for the LTE and n34 and n39 for the 5GNR may be used as the communication band D, the communication band D is not limited these bands.

The switch 51 is connected to the duplexers 61 and 63 and the transmission-reception filters 62 and 64. The switch 51 has terminals 511 to 516. The terminals 511 and 512 are connected to the antenna connection terminals 104 and 105, respectively. The terminals 513 to 516 are connected to the duplexer 61, the transmission-reception filter 62, the duplexer 63, and the transmission-reception filter 64, respectively.

In this connection configuration, the switch 51 is capable of connecting the terminal 511 to either of the terminals 513 and 514 and connecting the terminal 512 to either of the terminals 515 and 516, for example, based on a control signal from the RFIC 3. In other words, the switch 51 is capable of connecting the antenna connection terminal 104 to either of the duplexer 61 and the transmission-reception filter 62 and connecting the antenna connection terminal 105 to either of the duplexer 63 and the transmission-reception filter 64. The switch 51 is composed of, for example, two single-pole double-throw (SPDT) switch circuits and may be called an antenna switch.

The switch 52 is connected between the transmission filter 61T and the transmission-reception filter 62, and the power amplifier 11 and is connected between the transmission-reception filter 62 and the low noise amplifier 21. The switch 52 has terminals 521 to 524. The terminals 521 and 522 are connected to the transmission filter 61T and the transmission-reception filter 62, respectively. The terminal 523 is connected to the output of the power amplifier 11. The terminal 524 is connected to a terminal 532 of the switch 53 and is connected to the input of the low noise amplifier 21 via the switch 53.

In this connection configuration, the switch 52 is capable of connecting the terminal 521 to the terminal 523 and connecting the terminal 522 to either of the terminals 523 and 524, for example, based on a control signal from the RFIC 3. In other words, the switch 52 is capable of switching between connection and non-connection between the transmission filter 61T and the power amplifier 11 and connection and non-connection between the transmission-reception filter 62 and each of the power amplifier 11 and the low noise amplifier 21. The switch 52 is composed of, for example, a multi-connection-type switch circuit.

The switch 53 is connected between the reception filter 61R and the low noise amplifier 21 and is connected between the transmission-reception filter 62 and the low noise amplifier 21. The switch 53 has terminals 531 to 533. The terminal 531 is connected to the input of the low noise amplifier 21. The terminal 532 is connected to the terminal 524 of the switch 52 and is connected to the transmission-reception filter 62 via the switch 52. The terminal 533 is connected to the reception filter 61R.

In this connection configuration, the switch 53 is capable of connecting the terminal 532 and/or 533 to the terminal 531, for example, based on a control signal from the RFIC 3. In other words, the switch 53 is capable of switching between connection and non-connection between the reception filter 61R and the low noise amplifier 21 and connection and non-connection between the transmission-reception filter 62 and the low noise amplifier 21. The switch 53 is composed of, for example, a multi-connection-type switch circuit.

The switch 54 is connected between the transmission filter 63T and the transmission-reception filter 64, and the power amplifier 12 and is connected between the transmission-reception filter 64 and the low noise amplifier 22 via the switch 55. The switch 54 has terminals 541 to 544. The terminals 541 and 542 are connected to the transmission filter 63T and the transmission-reception filter 64, respectively. The terminal 543 is connected to the output of the power amplifier 12. The terminal 544 is connected to a terminal 552 of the switch 55 and is connected to the input of the low noise amplifier 22 via the switch 55.

In this connection configuration, the switch 54 is capable of connecting the terminal 541 to the terminal 543 and connecting the terminal 542 to either of the terminals 543 and 544, for example, based on a control signal from the RFIC 3. In other words, the switch 54 is capable of switching between connection and non-connection between the transmission filter 63T and the power amplifier 12 and connection and non-connection between the transmission-reception filter 64 and each of the power amplifier 12 and the low noise amplifier 22. The switch 54 is composed of, for example, a multi-connection-type switch circuit.

The switch 55 is connected between the reception filter 63R and the low noise amplifier 22 and is connected between the transmission-reception filter 64 and the low noise amplifier 22 via the switch 54. The switch 55 has terminals 551 to 553. The terminal 551 is connected to the input of the low noise amplifier 22. The terminal 552 is connected to the terminal 544 of the switch 54 and is connected to the transmission-reception filter 64 via the switch 54. The terminal 553 is connected to the reception filter 63R.

In this connection configuration, the switch 55 is capable of connecting the terminal 552 and/or 553 to the terminal 551, for example, based on a control signal from the RFIC 3. In other words, the switch 55 is capable of switching between connection and non-connection between the reception filter 63R and the low noise amplifier 22 and connection and non-connection between the transmission-reception filter 64 and the low noise amplifier 22. The switch 55 is composed of, for example, a multi-connection-type switch circuit.

Some of the circuit elements illustrated in FIG. 1 are not necessarily included in the radio-frequency module 1. For example, it is sufficient for the radio-frequency module 1 to include at least the power amplifiers 11 and 12, the switch 51, the transmission filter 61T or the transmission-reception filter 62, and the transmission filter 63T or the transmission-reception filter 64, and the radio-frequency module 1 does not necessarily include the other circuit elements.

In addition, for example, the radio-frequency module 1 does not necessarily include the switch 53. In this case, the radio-frequency module 1 may include two low noise amplifiers, instead of the low noise amplifier 21. At this time, the other end of the reception filter 61R may be connected to one of the two low noise amplifiers and the other end of the transmission-reception filter 62 may be connected to the other of the two low noise amplifiers via the switch 52.

Similarly, the radio-frequency module 1 does not necessarily include the switch 55. In this case, the radio-frequency module 1 may include two low noise amplifiers, instead of the low noise amplifier 22. At this time, the other end of the reception filter 63R may be connected to one of the two low noise amplifiers and the other end of the transmission-reception filter 64 may be connected to the other of the two low noise amplifiers via the switch 54.

1.2 Circuit Configuration of Communication Apparatuses 5A and 5B

Figure 2:
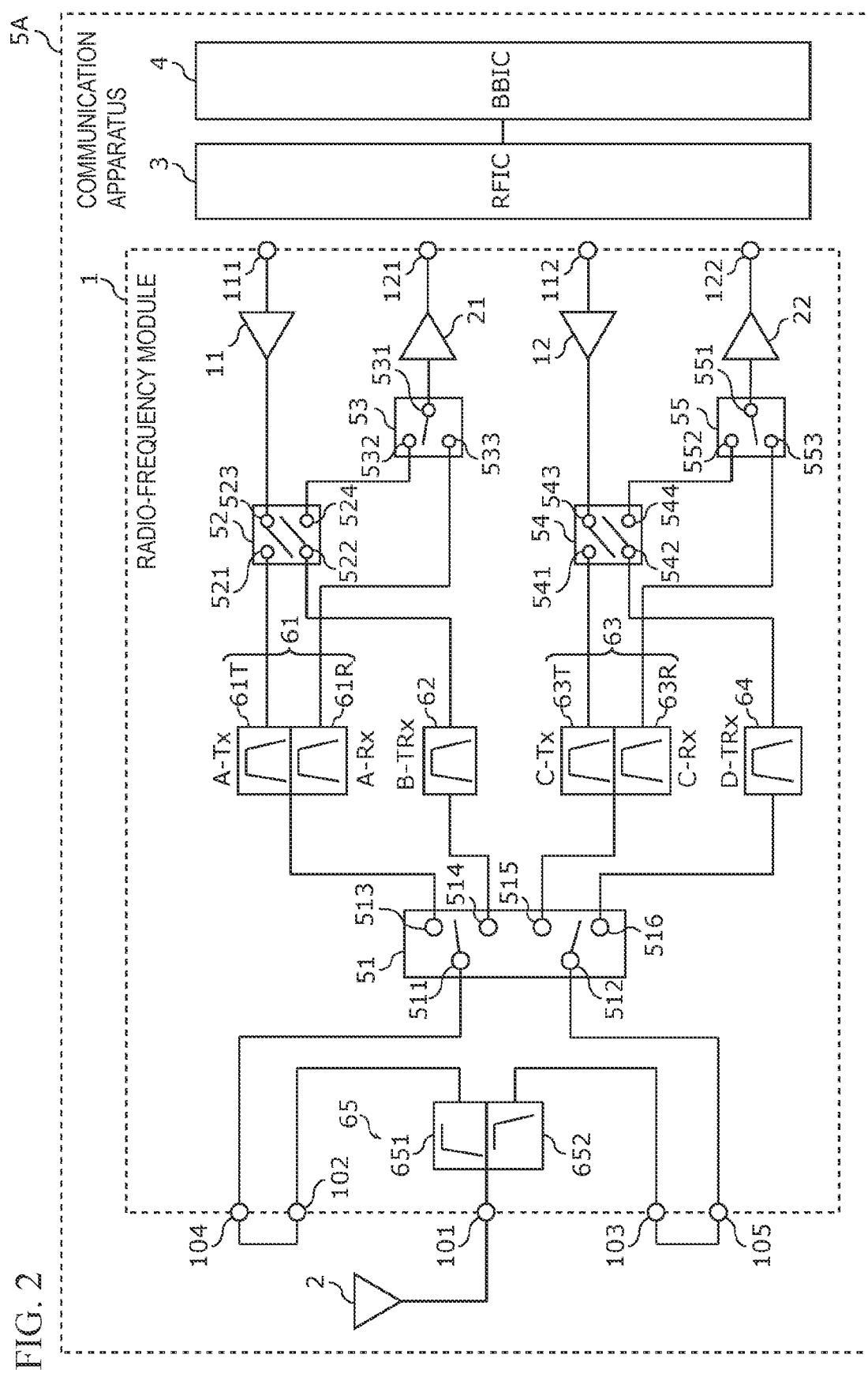
FIG. 2 is a diagram illustrating the circuit configuration of a communication apparatus according to a first example of the first embodiment.
Figure 3:
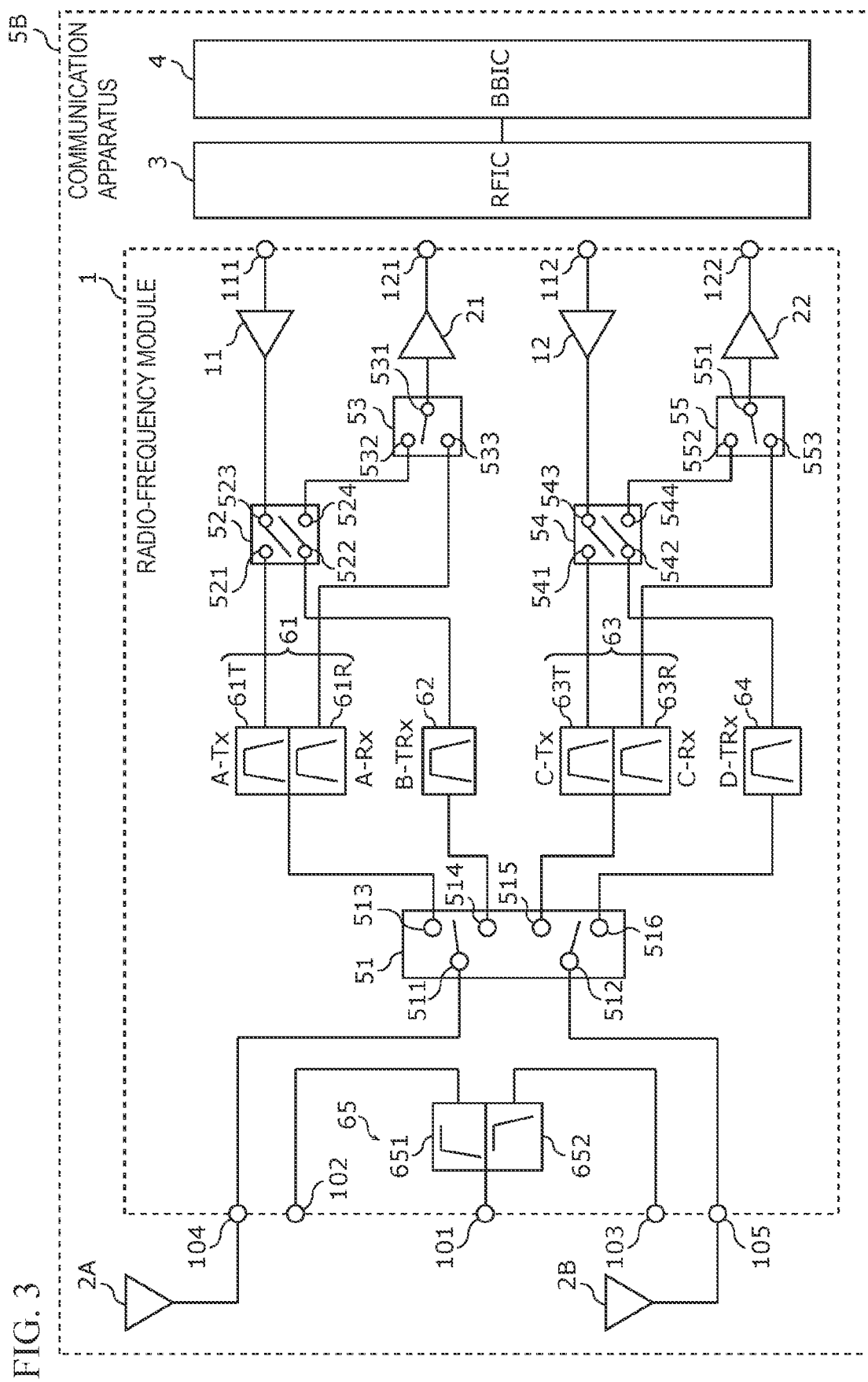
FIG. 3 is a diagram illustrating the circuit configuration of a communication apparatus according to a second example of the first embodiment.

Examples of communication apparatuses including the radio-frequency module 1 having the above configuration will now be described with reference to FIG. 2 and FIG. 3. FIG. 2 is a diagram illustrating the circuit configuration of a communication apparatus 5A according to a first example of the first embodiment. FIG. 3 is a diagram illustrating the circuit configuration of a communication apparatus 5B according to a second example of the first embodiment.

First, the circuit configuration common to the communication apparatuses 5A and 5B according to the first and second examples will be described.

As illustrated in FIG. 2 and FIG. 3, the communication apparatuses 5A and 5B each includes the radio-frequency module 1, the RFIC 3, and a baseband integrated circuit (BBIC) 4.

The radio-frequency module 1 transmits the radio-frequency signal between an antenna 2 or antennas 2A and 2B and the RFIC 3.

The RFIC 3 is an example of a signal processing circuit that processes the radio-frequency signal. Specifically, the RFIC 3 performs signal processing, such as down-conversion, to the radio-frequency reception signal input through a reception path of the radio-frequency module 1 and supplies a reception signal resulting from the signal processing to the BBIC 4. In addition, the RFIC 3 performs signal processing, such as up-conversion, to a transmission signal supplied from the BBIC 4 and supplies the radio-frequency transmission signal resulting from the signal processing to a transmission path of the radio-frequency module 1. The RFIC 3 includes a control unit that controls switches, amplifiers, and so on in the radio-frequency module 1. Part of or all the function of the RFIC 3 serving as the control unit may be installed outside the RFIC 3. For example, part of or all the function of the RFIC 3 serving as the control unit may be installed in, for example, the BBIC 4 or the radio-frequency module 1.

The BBIC 4 is a baseband signal processing circuit that performs signal processing using an intermediate frequency band lower than the frequency of the radio-frequency signal transmitted by the radio-frequency module 1. For example, an image signal for image display and/or an audio signal for talking with a speaker is used as the signal processed in the BBIC 4.

In the communication apparatuses 5A and 5B, the BBIC 4 is an optional component.

1.2.1 First Example

Characteristic configurations of the communication apparatus 5A according to the first example will be described here. The communication apparatus 5A further includes the antenna 2.

The antenna 2 is connected to the antenna connection terminal 101 of the radio-frequency module 1. A radio-frequency signal output from the radio-frequency module 1 is transmitted through the antenna 2, and a radio-frequency signal is externally received through the antenna 2 and is supplied to the radio-frequency module 1.

The antenna connection terminals 102 and 104 of the radio-frequency module 1 are directly connected to each other, and the antenna connection terminals 103 and 105 thereof are directly connected to each other. In other words, the antenna connection terminal 102 is short-circuited from the antenna connection terminal 104 and the antenna connection terminal 103 is short-circuited from the antenna connection terminal 105. With this configuration, the diplexer 65 is enabled and the switch 51 in the radio-frequency module 1 is connected to the antenna 2 via the diplexer 65.

In the communication apparatus 5A, the antenna 2 is an optional component.

1.2.2 Second Example

Characteristic configurations of the communication apparatus 5B according to the second example will be described here. The communication apparatus 5B further includes the antennas 2A and 2B. The antennas 2A and 2B are examples of a first antenna and a second antenna, respectively. A radio-frequency signal output from the radio-frequency module 1 is transmitted through the antenna 2A or 2B, and a radio-frequency signal is externally received through the antenna 2A or 2B and is supplied to the radio-frequency module 1.

The antenna connection terminal 104 of the radio-frequency module 1 is connected to the antenna 2A, and the antenna connection terminal 105 thereof is connected to the antenna 2B. With this configuration, the diplexer 65 is disabled and the switch 51 in the radio-frequency module 1 is connected to the antennas 2A and 2B not via the diplexer 65.

In the communication apparatus 5B, the antennas 2A and 2B are not essential components.

1.3 Arrangement of Components in Radio-Frequency Module 1

The arrangement of the components in the radio-frequency module 1 configured in the above manner will now be specifically described with reference to FIG. 4 to FIG. 6.

Figure 4:
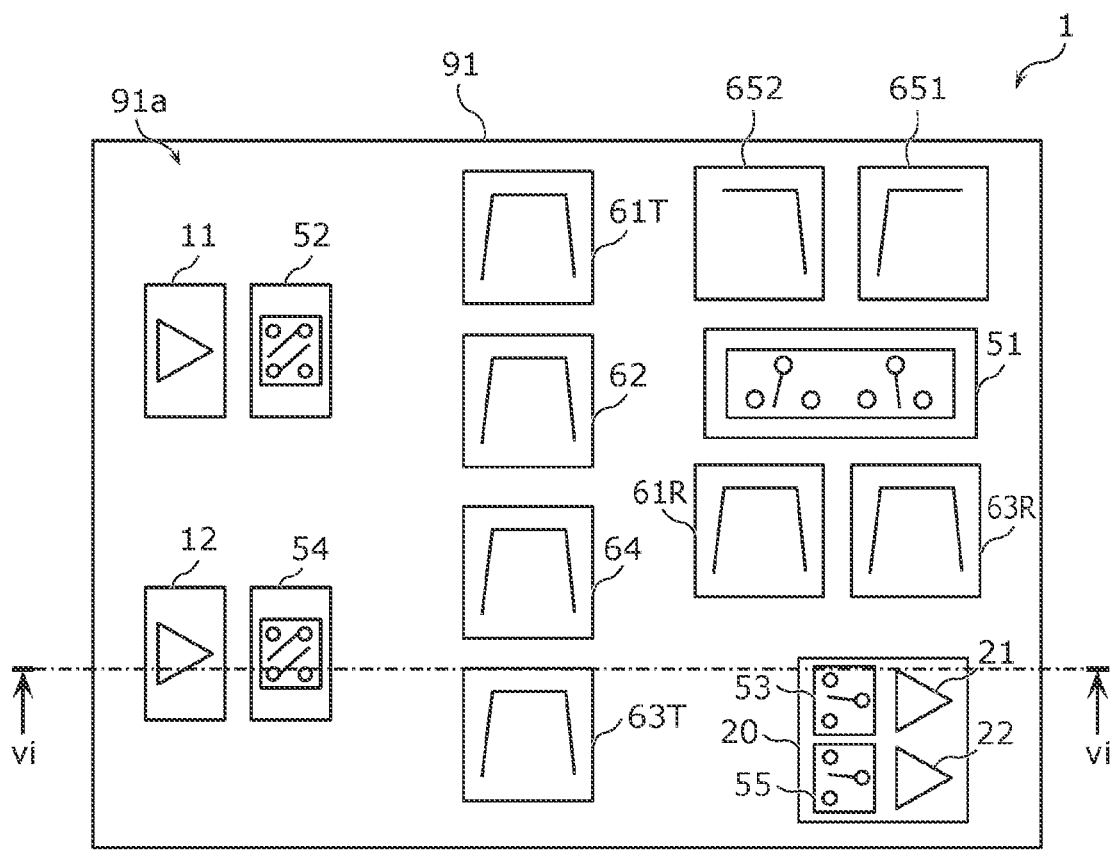
FIG. 4 is a plan view of the radio-frequency module according to the first embodiment.

FIG. 4 is a plan view of the radio-frequency module 1 according to the first embodiment. Specifically, FIG. 4 is a diagram when a main surface 91a of a module substrate 91 is viewed from the positive side of the z axis. FIG. 5 is a plan view of the radio-frequency module 1 according to the first embodiment. Specifically, FIG. 5 is a diagram when a main surface 91b of the module substrate 91 is seen through from the positive side of the z axis. FIG. 6 is a cross-sectional view of the radio-frequency module 1 according to the first embodiment. The cross section of the radio-frequency module 1 in FIG. 6 is a cross section taken along the vi-vi line in FIG. 4 and FIG. 5.

Figure 5:
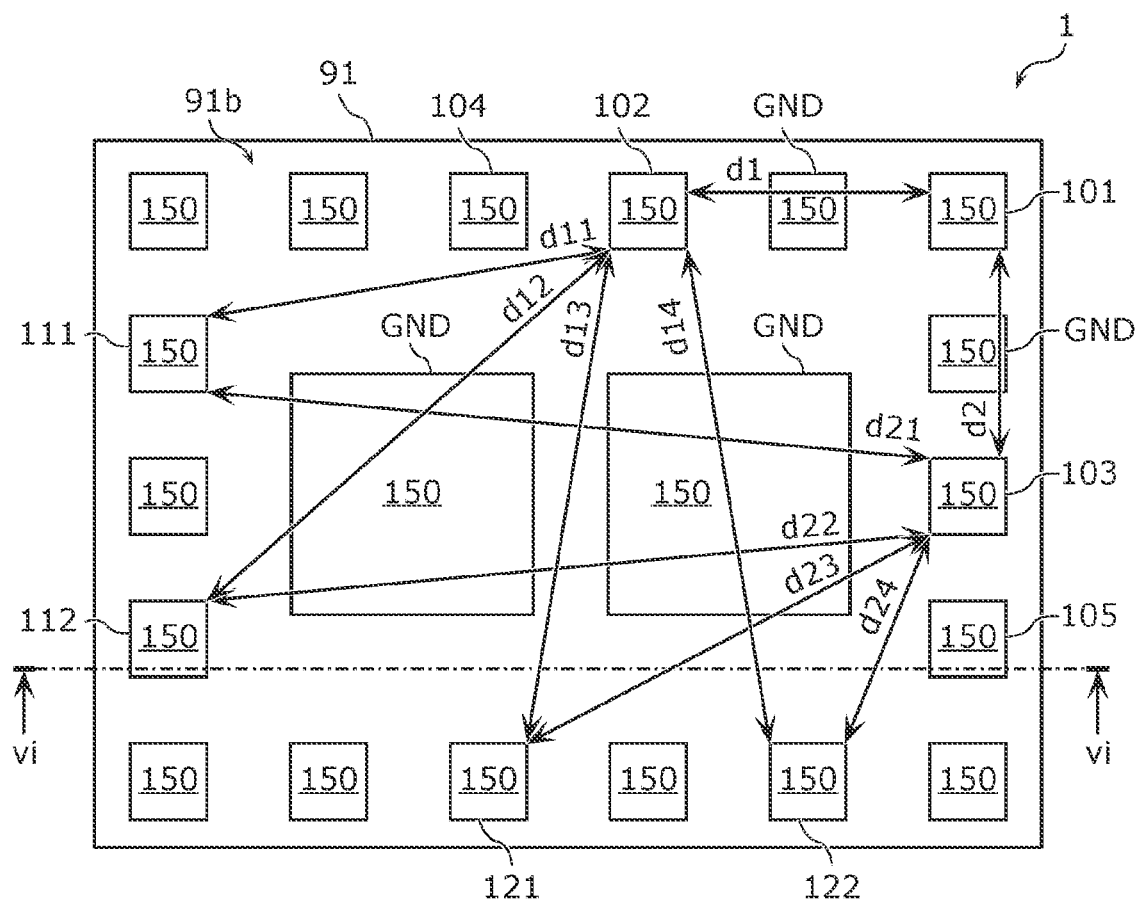
FIG. 5 is a plan view of the radio-frequency module according to the first embodiment.
Figure 6:
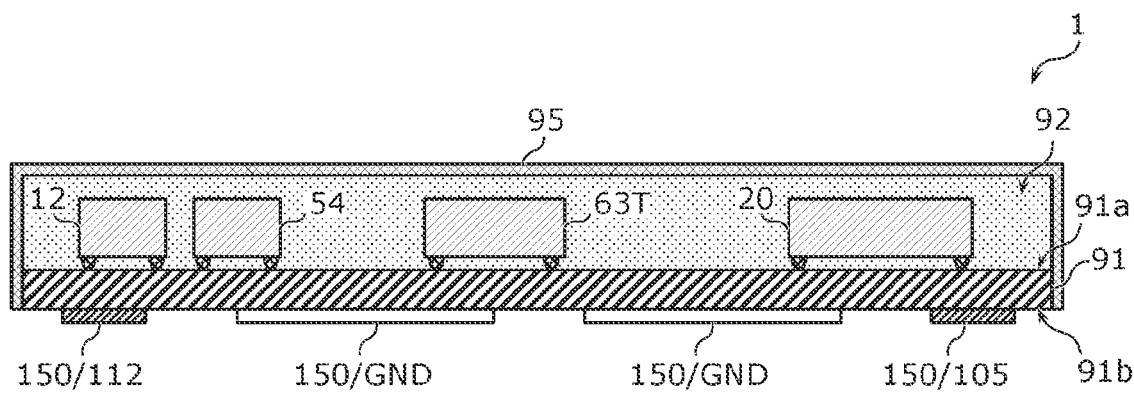
FIG. 6 is a cross-sectional view of the radio-frequency module according to the first embodiment.
Figure 6:
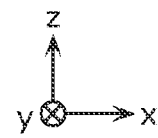

As illustrated in FIG. 4 to FIG. 6, the radio-frequency module 1 further includes the module substrate 91, a resin member 92, a shield electrode layer 95, and multiple external connection terminals 150, in addition to circuit components including the circuit elements illustrated in FIG. 1. The illustration of the resin member 92 and the shield electrode layer 95 is omitted in FIG. 4 and FIG. 5.

The module substrate 91 has the main surface 91a and the main surface 91b, which are opposed to each other. Although the module substrate 91 has a rectangular shape in a plan view in the present embodiment, the shape of the module substrate 91 is not limited to this. Although, for example, a low temperature co-fired ceramics (LTCC) substrate having a laminated structure of multiple dielectric layers, a high temperature co-fired ceramics (HTCC) substrate, a component built-in substrate, a substrate including a redistribution layer (RDL), or a printed circuit board may be used as the module substrate 91, the module substrate 91 is not limited to these substrates.

The main surface 91*a* is an example of a first main surface and may be called a top face or a surface. The power amplifiers 11 and 12, the low noise amplifiers 21 and 22, the switches 51 to 55, the duplexers 61 and 63, the transmission-reception filters 62 and 64, and the resin member 92 are arranged on the main surface 91*a*.

The low noise amplifiers 21 and 22 and the switches 53 and 55 are included in a semiconductor integrated circuit 20. The semiconductor integrated circuit 20 is an electronic component including an electronic circuit formed on the surface of a semiconductor chip (also called a die) and in the semiconductor chip. The semiconductor integrated circuit 20 is composed of, for example, complementary metal oxide semiconductor (CMOS) and, specifically, may be formed through a silicon on insulator (SOI) process. Accordingly, it is possible to inexpensively manufacture the semiconductor integrated circuit 20. The semiconductor integrated circuit 20 may be made of at least one of GaAs, SiGe, and GaN. This enables the high-quality semiconductor integrated circuit 20 to be realized.

Each of the transmission filters 61T and 63T, the reception filters 61R and 63R, the transmission-reception filters 62 and 64, and the filters 651 and 652 may be, for example, any of a surface-acoustic-wave filter, an acoustic wave filter using bulk acoustic waves (BAWs), an LC resonant filter, and a dielectric filter and is not limited to these filters.

The resin member 92 is arranged on the main surface 91*a* of the module substrate 91. The main surface 91*a* and the circuit components on the main surface 91*a* are covered with the resin member 92. The resin member 92 has a function to ensure the reliabilities, such as the mechanical strength and the moisture resistance, of the components on the main surface 91*a*.

The shield electrode layer 95 is a metallic thin film that is formed using, for example, a sputtering method. The shield electrode layer 95 is formed so as to cover the upper surface and the side faces of the resin member 92 and the side faces of the module substrate 91. The shield electrode layer 95 is set to ground potential to inhibit external noise from entering the circuit components composing the radio-frequency module 1.

The main surface 91*b* is an example of a second main surface and may be called a bottom face or a rear face. The multiple external connection terminals 150 are arranged on the main surface 91*b*.

The multiple external connection terminals 150 include ground terminals GND, in addition to the antenna connection terminals 101 to 105, the radio-frequency input terminals 111 and 112, and the radio-frequency output terminals 121 and 122 illustrated in FIG. 1. Each of the multiple external connection terminals 150 is connected to, for example, an input-output terminal and/or the ground terminal on a mother board arranged in the negative direction of the z axis of the radio-frequency module 1. Although pad electrodes may be used as the multiple external connection terminals 150, the multiple external connection terminals 150 are not limited to the pad electrodes.

As illustrated in FIG. 5, some of the multiple external connection terminals 150 are arranged side by side along the outer edge of the main surface 91*b* in a peripheral area surrounding a central area including the center of the main surface 91*b*. The antenna connection terminals 102 and 104 are included in some of the multiple external connection terminals 150 arranged in the peripheral area and are juxtaposed with each other. The antenna connection terminals 103 and 105 are also included in some of the multiple external connection terminals 150 arranged in the peripheral area and are juxtaposed with each other.

The ground terminal GND is arranged between the antenna connection terminals 102 and 103. In FIG. 5, the right-side ground terminal GND, among the two ground terminals GND arranged in the central area of the main surface 91*b*, is arranged between the antenna connection terminals 102 and 103.

The ground terminal GND is arranged between the antenna connection terminals 104 and 105. In FIG. 5, the right-side ground terminal GND, among the two ground terminals GND arranged in the central area of the main surface 91*b*, is arranged between the antenna connection terminals 104 and 105.

The ground terminal GND is arranged between the antenna connection terminals 101 and 102. In FIG. 5, the antenna connection terminal 102, the ground terminal GND, and the antenna connection terminal 101 are arranged side by side in this order along the x axis in the peripheral area of the main surface 91*b*.

A distance d1 between the antenna connection terminals 101 and 102 is shorter than a distance d11 between the antenna connection terminal 102 and the radio-frequency input terminal 111 and is shorter than a distance d12 between the antenna connection terminal 102 and the radio-frequency input terminal 112. In addition, the distance d1 between the antenna connection terminals 101 and 102 is shorter than a distance d13 between the antenna connection terminal 102 and the radio-frequency output terminal 121 and is shorter than a distance d14 between the antenna connection terminal 102 and the radio-frequency output terminal 122.

The ground terminal GND is arranged between the antenna connection terminals 101 and 103. In FIG. 5, the antenna connection terminal 103, the ground terminal GND, and the antenna connection terminal 101 are arranged side by side in this order along the y axis in the peripheral area of the main surface 91*b*.

A distance d2 between the antenna connection terminals 101 and 103 is shorter than a distance d21 between the antenna connection terminal 103 and the radio-frequency input terminal 111 and is shorter than a distance d22 between the antenna connection terminal 103 and the radio-frequency input terminal 112. In addition, the distance d2 between the antenna connection terminals 101 and 103 is shorter than a distance d23 between the antenna connection terminal 103 and the radio-frequency output terminal 121 and is shorter than a distance d24 between the antenna connection terminal 103 and the radio-frequency output terminal 122.

1.4 Effects

As described above, the radio-frequency module 1 according to the present embodiment includes the filter 651 having a passband including the communication band group X; the filter 652 having a passband including the communication band group Y different from the communication band group X; the duplexer 61 having a passband including the communication band A included in the communication band group X; the transmission-reception filter 62 having a passband including the communication band B, which is included in the communication band group X and which is different from the communication band A; the duplexer 63 having a passband including the communication band C included in the communication band group Y; the transmission-reception filter 64 having a passband including the communication band D, which is included in the communication band group Y and which is different from the communication band C; the switch 51 to be connected to the duplexer 61, the transmission-reception filter 62, the duplexer 63, and the transmission-reception filter 64; the multiple external connection terminals 150; and the module substrate 91 having the filter 651, the filter 652, the duplexer 61, the transmission-reception filter 62, the duplexer 63, the transmission-reception filter 64, the switch 51, and the multiple external connection terminals 150 arranged thereon. The multiple external connection terminals 150 include the antenna connection terminal 101 connected to one end of the filter 651 and one end of the filter 652; the antenna connection terminal 102 connected to the other end of the filter 651; the antenna connection terminal 103 connected to the other end of the filter 652; the antenna connection terminal 104 connected to the duplexer 61 and the transmission-reception filter 62 via the switch 51; and the antenna connection terminal 105 connected to the duplexer 63 and the transmission-reception filter 64 via the switch 51.

With the above configuration, the use of the antenna connection terminals 101 to 105 enables the radio-frequency module 1 to be used in both the communication apparatus 5A in which connection to one antenna 2 is requested and the communication apparatus 5B in which connection to the two antennas 2A and 2B is requested. Specifically, connecting the antenna 2 to the antenna connection terminal 101, short-circuiting the antenna connection terminal 102 from the antenna connection terminal 104, and short-circuiting the antenna connection terminal 103 from the antenna connection terminal 105 enable the radio-frequency module 1 to be used in the communication apparatus 5A in which connection to one antenna 2 is requested. In addition, connecting the antenna 2A to the antenna connection terminal 104 and connecting the antenna 2B to the antenna connection terminal 105 enables the radio-frequency module 1 to be used in the communication apparatus 5B in which connection to the two antennas 2A and 2B is requested. Accordingly, it is possible to commonly use the radio-frequency module product in the communication apparatuses of the two kinds, which have different requests.

For example, in the radio-frequency module 1 according to the present embodiment, the antenna connection terminals 102 and 104 may be juxtaposed with each other on the same main surface of the module substrate 91. The antenna connection terminals 103 and 105 may be juxtaposed with each other on the same main surface of the module substrate 91.

With the above configuration, directly connecting the two terminals that are juxtaposed with each other simply enables short-circuiting between the antenna connection terminals 102 and 104 and short-circuiting between the antenna connection terminals 103 and 105. In addition, it is possible to shorten the wiring length between the antenna connection terminals 102 and 104 and the wiring length between the antenna connection terminals 103 and 105 to reduce wiring loss, thus improving electrical characteristics (for example, noise figure (NF)) of the radio-frequency module 1.

For example, in the radio-frequency module 1 according to the present embodiment, the multiple external connection terminals 150 may further include the ground terminal GND that is set to the ground potential and that is arranged between the antenna connection terminals 102 and 103.

With the above configuration, it is possible to improve isolation between the antenna connection terminals 102 and 103, through which the signals of different communication band groups are transmitted, to improve the electrical characteristics of the radio-frequency module 1.

For example, in the radio-frequency module 1 according to the present embodiment, the multiple external connection terminals 150 may further include the ground terminal GND that is set to the ground potential and that is arranged between the antenna connection terminals 104 and 105.

With the above configuration, it is possible to improve the isolation between the antenna connection terminals 104 and 105, through which the signals of different communication band groups are transmitted, to improve the electrical characteristics of the radio-frequency module 1.

For example, in the radio-frequency module 1 according to the present embodiment, the multiple external connection terminals 150 may further include the ground terminal GND that is set to the ground potential and that is arranged between the antenna connection terminals 101 and 102.

With the above configuration, it is possible to improve the isolation between the antenna connection terminal 101 through which the signals in both of the two communication band groups are transmitted and the antenna connection terminal 102 through which the signals in only one of the two communication band groups are transmitted to improve the electrical characteristics of the radio-frequency module 1.

For example, in the radio-frequency module 1 according to the present embodiment, the multiple external connection terminals 150 may further include the ground terminal GND that is set to the ground potential and that is arranged between the antenna connection terminals 101 and 103.

With the above configuration, it is possible to improve the isolation between the antenna connection terminal 101 through which the signals in both of the two communication band groups are transmitted and the antenna connection terminal 103 through which the signals in only one of the two communication band groups are transmitted to improve the electrical characteristics of the radio-frequency module 1.

For example, in the radio-frequency module 1 according to the present embodiment, the multiple external connection terminals 150 may further include the radio-frequency output terminal 121 and/or 122 for supplying the radio-frequency reception signal to the outside. The distance d1 between antenna connection terminals 101 and 102 may be shorter than the distance d13 and/or d14 between the antenna connection terminal 102 and the radio-frequency output terminal 121 and/or 122. The distance d2 between the antenna connection terminals 101 and 103 may be shorter than the distance d23 and/or d24 between the antenna connection terminal 103 and the radio-frequency output terminal 121 and/or 122.

With the above configuration, the distance d1 between the antenna connection terminals 101 and 102 is capable of being relatively shortened to shorten the wiring length between the antenna connection terminals 101 and 102. Accordingly, it is possible to reduce the wiring loss to improve the electrical characteristics of the radio-frequency module 1.

For example, in the radio-frequency module 1 according to the present embodiment, the multiple external connection terminals 150 may further include the radio-frequency input terminal 111 and/or 112 for receiving the radio-frequency transmission signal from the outside. The distance d1 between the antenna connection terminals 101 and 102 may be shorter than the distance d11 and/or d12 between the antenna connection terminal 102 and the radio-frequency input terminal 111 and/or 112. The distance d2 between the antenna connection terminal 101 and the antenna connection terminal 103 may be shorter than the distance d21 and/or d22 between the antenna connection terminal 103 and the radio-frequency input terminal 111 and/or 112.

With the above configuration, the distance d2 between the antenna connection terminals 101 and 103 is capable of being relatively shortened to shorten the wiring length between the antenna connection terminals 101 and 103. Accordingly, it is possible to reduce the wiring loss to improve the electrical characteristics of the radio-frequency module 1.

For example, in the radio-frequency module 1 according to the present embodiment, the communication band group X may have a frequency range that is higher than or equal to 2,300 MHz and that is lower than 2,690 MHz.

With the above configuration, it is possible to use the radio-frequency module 1 for the communication in the so-called high band group.

For example, in the radio-frequency module 1 according to the present embodiment, the communication band A may include at least one of Band7 for LTE and n7 for 5GNR.

With the above configuration, it is possible to use the radio-frequency module 1 for the communication in communication bands for the LTE and/or the 5GNR included in the high band group.

For example, in the radio-frequency module 1 according to the present embodiment, the communication band B may include at least one of Band41 and Band40 for the LTE and n41 and n40 for the 5GNR.

With the above configuration, it is possible to use the radio-frequency module 1 for the transmission and/or the reception of the signals in the communication bands for the LTE and/or the 5GNR included in the high band group.

For example, in the radio-frequency module 1 according to the present embodiment, the communication band group Y may have a frequency range that is higher than or equal to 1,427 MHz and that is lower than 2,200 MHz.

With the above configuration, it is possible to use the radio-frequency module 1 for the communication in the so-called middle band group.

For example, in the radio-frequency module 1 according to the present embodiment, the communication band C may include at least one of Band1, Band25, Band3, and Band66 for the LTE and n1, n25, n3, and n66 for the 5GNR.

With the above configuration, it is possible to use the radio-frequency module 1 for the transmission and/or the reception of the signals in the communication bands for the LTE and/or the 5GNR included in the middle band group.

For example, in the radio-frequency module 1 according to the present embodiment, the communication band D may include at least one of Band34 and Band39 for the LTE and n34 and n39 for the 5GNR.

With the above configuration, it is possible to use the radio-frequency module 1 for the transmission and/or the reception of the signals in the communication bands for the LTE and/or the 5GNR included in the middle band group.

The communication apparatuses 5A and 5B according to the present embodiment includes the RFIC 3 that processes a radio-frequency signal and the radio-frequency module 1, which transmits the radio-frequency signal between the RFIC 3 and at least one antenna.

With the above configuration, the communication apparatuses 5A and 5B are capable of achieving the effects similar to those of the radio-frequency module 1.

For example, in the communication apparatus 5A according to the present embodiment, the antenna connection terminal 101 may be connected to the at least one antenna 2. The antenna connection terminal 102 may be short-circuited from the antenna connection terminal 104. The antenna connection terminal 103 may be short-circuited from the antenna connection terminal 105.

With the above configuration, the communication apparatus 5A is capable of communication using the two communication band groups with one antenna 2.

For example, in the communication apparatus 5B according to the present embodiment, the at least one antenna may include the antennas 2A and 2B. The antenna connection terminal 104 may be connected to the antenna 2A. The antenna connection terminal 105 may be connected to the antenna 2B.

With the above configuration, the communication apparatus 5B is capable of communication using the two communication band groups with the two antennas 2A and 2B.

Second Embodiment

Next, a second embodiment will be described. The present embodiment mainly differs from the first embodiment described above in that the radio-frequency module has a configuration capable of communication using three communication band groups. The present embodiment will now be described with reference to the drawing, focusing on the points different from the first embodiment described above.

2.1 Circuit Configuration of Radio-Frequency Module 1A

Figure 7:
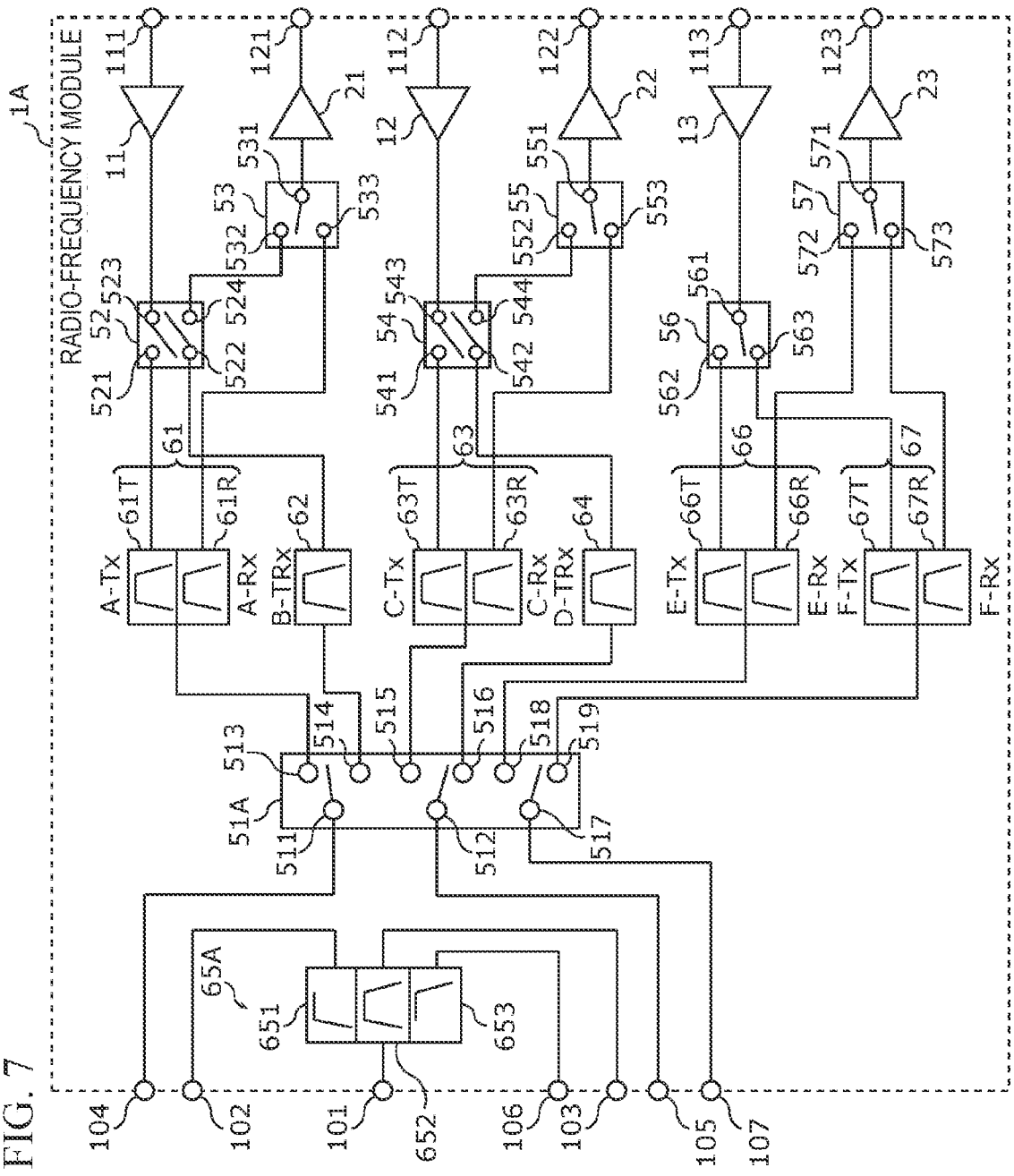
FIG. 7 is a diagram illustrating the circuit configuration of a radio-frequency module according to a second embodiment.

The circuit configuration of a radio-frequency module 1A according to the present embodiment will be described with reference to FIG. 7. FIG. 7 is a diagram illustrating the circuit configuration of the radio-frequency module 1A according to the second embodiment.

As illustrated in FIG. 7, the radio-frequency module 1A includes power amplifiers 11 to 13, low noise amplifiers 21 to 23, a switch 51A and switches 52 to 57, duplexers 61, 63, 66 and 67, the transmission-reception filters 62 and 64, a triplexer 65A, antenna connection terminals 101 to 107, radio-frequency input terminals 111 to 113, and radio-frequency output terminals 121 to 123.

The antenna connection terminal 101 is connected to one end of a filter 653, in addition to one end of the filter 651 and one end of the filter 652, in the radio-frequency module 1A. The antenna connection terminal 106 is an example of an eighth external connection terminal and is connected to the other end of the filter 653 in the radio-frequency module 1A. The antenna connection terminal 107 is an example of a ninth external connection terminal and is connected to the duplexers 66 and 67 via the switch 51A in the radio-frequency module 1A.

The radio-frequency input terminal 113 is a terminal for receiving the radio-frequency transmission signal from the outside of the radio-frequency module 1A. In the present embodiment, the radio-frequency input terminal 113 is a terminal for receiving the transmission signals in communication bands E and F included in a communication band group Z from the RFIC 3.

The radio-frequency output terminal 123 is a terminal for supplying the radio-frequency reception signal to the outside of the radio-frequency module 1A. In the present embodiment, the radio-frequency output terminal 123 is a terminal for supplying the reception signals in the communication bands E and F included in the communication band group Z to the RFIC 3.

The power amplifier 13 is capable of amplifying the transmission signals in the communication bands E and F received through the radio-frequency input terminal 113. Here, an input of the power amplifier 13 is connected to the radio-frequency input terminal 113 and an output of the power amplifier 13 is connected to the switch 56.

The low noise amplifier 23 is capable of amplifying the reception signals in the communication bands E and F. The reception signals in the communication bands E and F, which are amplified by the low noise amplifier 23, are supplied to the radio-frequency output terminal 123.

The triplexer 65A includes the three filters 651 to 653 each having the three passbands. The passbands of the three filters 651 to 653 are different from each other. In the triplexer 65A, the three filters 651 to 653 are tied to be connected to one antenna connection terminal 101.

The filter 653 is an example of a seventh filter and has a passband including the communication band group Z. In other words, the filter 653 passes the signals in the respective communication bands included in the communication band group Z. One end of the filter 653 is connected to the antenna connection terminal 101 and the other end of the filter 653 is connected to the antenna connection terminal 106.

The duplexer 66 is an example of an eighth filter and has a passband including the communication band E. The duplexer 66 transmits the transmission signal and the reception signal in the communication band E using the FDD method. The duplexer 66 includes a transmission filter 66T and a reception filter 66R.

The transmission filter 66T (E-Tx) has a passband including the uplink operating band of the communication band E. One end of the transmission filter 66T is connected to the antenna connection terminal 107 via the switch 51A. The other end of the transmission filter 66T is connected the output of the power amplifier 13 via the switch 56.

The reception filter 66R (E-Rx) has a passband including the downlink operating band of the communication band E. One end of the reception filter 66R is connected to the antenna connection terminal 107 via the switch 51A. The other end of the reception filter 66R is connected to an input of the low noise amplifier 23 via the switch 57.

The duplexer 67 is an example of a ninth filter and has a passband including the communication band F. The duplexer 67 transmits the transmission signal and the reception signal in the communication band F using the FDD method. The duplexer 67 includes a transmission filter 67T and a reception filter 67R.

The transmission filter 67T (F-Tx) has a passband including the uplink operating band of the communication band F. One end of the transmission filter 67T is connected to the antenna connection terminal 107 via the switch 51A. The other end of the transmission filter 67T is connected the output of the power amplifier 13 via the switch 56.

The reception filter 67R (F-Rx) has a passband including the downlink operating band of the communication band F. One end of the reception filter 67R is connected to the antenna connection terminal 107 via the switch 51A. The other end of the reception filter 67R is connected to the input of the low noise amplifier 23 via the switch 57.

The switch 51A is connected to the duplexers 61, 63, 66, and 67 and the transmission-reception filters 62 and 64. The switch 51A has terminals 511 to 519. The terminal 517 is connected to the antenna connection terminal 107. The terminals 518 and 519 are connected to the duplexers 66 and 67, respectively.

In this connection configuration, the switch 51A is capable of connecting the terminal 511 to either of the terminals 513 and 514, for example, based on a control signal from the RFIC 3. In other words, the switch 51A is capable of connecting the antenna connection terminal 104 to either of the duplexer 61 and the transmission-reception filter 62. Furthermore, the switch 51A is capable of connecting the terminal 512 to either of the terminals 515 and 516, for example, based on a control signal from the RFIC 3. In other words, the switch 51A is capable of connecting the antenna connection terminal 105 to either of the duplexer 63 and the transmission-reception filter 64. Furthermore, the switch 51A is capable of connecting the terminal 517 to either of the terminals 518 and 519. In other words, the switch 51A is capable of connecting the antenna connection terminal 107 to either of duplexers 66 and 67. The switch 51A is composed of, for example, three SPDT switch circuits and may be called an antenna switch.

The switch 56 is connected between the transmission filters 66T and 67T and the power amplifier 13. The switch 56 has terminals 561 to 563. The terminal 561 is connected to the output of the power amplifier 13. The terminals 562 and 563 are connected to the transmission filters 66T and 67T, respectively.

In this connection configuration, the switch 56 is capable of connecting the terminal 561 to either of the terminals 562 and 563, for example, based on a control signal from the RFIC 3. In other words, the switch 56 is capable of connecting the output of the power amplifier 13 to either of the transmission filters 66T and 67T. The switch 56 is composed of, for example, an SPDT switch circuit.

The switch 57 is connected between the reception filters 66R and 67R and the low noise amplifier 23. The switch 57 has terminals 571 to 573. The terminal 571 is connected to the input of the low noise amplifier 23. The terminals 572 and 573 are connected to the reception filters 66R and 67R, respectively.

In this connection configuration, the switch 57 is capable of connecting the terminal 571 to either of the terminals 572 and 573, for example, based on a control signal from the RFIC 3. In other words, the switch 57 is capable of connecting the input of the low noise amplifier 23 to either of the reception filters 66R and 67R. The switch 57 is composed of, for example, an SPDT switch circuit.

The communication band group Z is an example of a third communication band group. Although, for example, the low band group may be used as the communication band group Z, the communication band group Z is not limited to this.

The communication band E is an example of a fifth communication band and is included in the communication band group Z. In the present embodiment, a communication band for the FDD is used as the communication band E. More specifically, although at least one of Band8, Band18, Band19, Band26, and Band28 for the LTE and n8, n18, n19, n26, and n28 for the 5GNR may be used as the communication band E, the communication band E is not limited to these bands.

The communication band F is an example of a sixth communication band. The communication band F is included in the communication band group Z but is different from the communication band E. In the present embodiment, a communication band for the FDD, which is different from the communication band E, is used as the communication band F. More specifically, although at least one of Band8, Band18, Band19, Band26, and Band28 for the LTE and n8, n18, n19, n26, and n28 for the 5GNR may be used as the communication band F, the communication band F is not limited to these bands.

Since the concept of the arrangement of the components in the radio-frequency module 1A according to the present embodiment is the same as that in the first embodiment described above, the illustration of the arrangement of the components in the radio-frequency module 1A according to the present embodiment is omitted herein. Also in the present embodiment, the antenna connection terminals 102 and 104 are juxtaposed with each other and the antenna connection terminals 103 and 105 are juxtaposed with each other, as in the first embodiment described above. In the present embodiment, the antenna connection terminals 106 and 107 are also juxtaposed with each other.

2.2 Effects

As described above, the radio-frequency module 1A according to the present embodiment includes the filter 651 having a passband including the communication band group X; the filter 652 having a passband including the communication band group Y different from the communication band group X; the duplexer 61 having a passband including the communication band A included in the communication band group X; the transmission-reception filter 62 having a passband including the communication band B, which is included in the communication band group X and which is different from the communication band A; the duplexer 63 having a passband including the communication band C included in the communication band group Y; the transmission-reception filter 64 having a passband including the communication band D, which is included in the communication band group Y and which is different from the communication band C; the switch 51A to be connected to the duplexer 61, the transmission-reception filter 62, the duplexer 63, and the transmission-reception filter 64; the multiple external connection terminals 150; and the module substrate 91 having the filter 651, the filter 652, the duplexer 61, the transmission-reception filter 62, the duplexer 63, the transmission-reception filter 64, the switch 51A, and the multiple external connection terminals 150 arranged thereon. The multiple external connection terminals 150 include the antenna connection terminal 101 connected to one end of the filter 651 and one end of the filter 652; the antenna connection terminal 102 connected to the other end of the filter 651; the antenna connection terminal 103 connected to the other end of the filter 652; the antenna connection terminal 104 connected to the duplexer 61 and the transmission-reception filter 62 via the switch 51A; and the antenna connection terminal 105 connected to the duplexer 63 and the transmission-reception filter 64 via the switch 51A. The radio-frequency module 1A further includes the filter 653 having a passband including the communication band group Z, which is different from the communication band group X and the communication band group Y; the duplexer 66 having a passband including the communication band E included in communication band group Z; and the duplexer 67 having a passband including the communication band F, which is included in the communication band group Z and which is different from the communication band E. The switch 51A is further connected to the duplexer 66 and the duplexer 67. The antenna connection terminal 101 is further connected to one end of the filter 653. The multiple external connection terminals 150 further include the antenna connection terminal 106 connected to the other end of the filter 653 and the antenna connection terminal 107 connected to the duplexer 66 and the duplexer 67 via the switch 51A.

With the above configuration, the use of the antenna connection terminals 101 to 107 enables the radio-frequency module 1A to be used in both the case in which connection to one antenna is requested and the case in which connection to the three antennas is requested. Accordingly, it is possible to commonly use the radio-frequency module product in the communication apparatuses of the two kinds, which have different requests.

For example, in the radio-frequency module 1A according to the present embodiment, the communication band group Z may have a frequency range that is higher than or equal to 698 MHz and that is lower than 960 MHz.

With the above configuration, it is possible to use the radio-frequency module 1A in the communication in the so-called low band group.

Other Embodiments

Although the radio-frequency modules and the communication apparatuses according to the present disclosure are described above based on the embodiments, the radio-frequency modules and the communication apparatuses according to the present disclosure are not limited to the above embodiments. Other embodiments realized by combining arbitrary components in the above embodiments, modifications resulting from making various modifications supposed by the person skilled in the art to the above embodiments without necessarily departing from the sprit and scope of the present disclosure, various devices incorporating the radio-frequency modules and the communication apparatuses are also included in the present disclosure.

For example, other circuit elements, lines, and so on may be provided between the paths connecting the respective circuit elements and signal paths disclosed in the drawings in the circuit configuration of the radio-frequency module and the communication apparatus according to each embodiment described above. For example, an impedance matching circuit may be provided between the two circuit elements. The impedance matching circuit may be composed of, for example, an inductor and/or a capacitor.

Although the two switches 52 and 53 are used for connection and non-connection between the duplexer 61 and the transmission-reception filter 62 and the power amplifier 11 and the low noise amplifier 21 in each embodiment described above, the switch configuration is not limited to this. For example, the switches 52 and 53 may be composed of a single switch circuit. In this case, it is sufficient for the single switch circuit to have five terminals connected to the transmission filter 61T, the reception filter 61R, the transmission-reception filter 62, the output of the power amplifier 11, and the output of the low noise amplifier 21. In addition, the switches 54 and 55 may be composed of a single switch circuit, as in the switches 52 and 53.

Although the radio-frequency modules 1 and 1A each includes the switch 53 for switching the filter to be connected to the low noise amplifier 21 in each embodiment described above, the radio-frequency modules 1 and 1A do not necessarily include the switch 53. In this case, the radio-frequency modules 1 and 1A may each include two low noise amplifiers, instead of the low noise amplifier 21. At this time, the other end of the reception filter 61R may be connected to one of the two low noise amplifiers and the other end of the transmission-reception filter 62 may be connected to the other of the two low noise amplifiers via the switch 52.

Similarly, the radio-frequency modules 1 and 1A do not necessarily include the switch 55. In this case, the radio-frequency module 1 may include two low noise amplifiers, instead of the low noise amplifier 22. At this time, the other end of the reception filter 63R may be connected to one of the two low noise amplifiers and the other end of the transmission-reception filter 64 may be connected to the other of the two low noise amplifiers via the switch 54.

The arrangement of the components in the first embodiment is only an example and is not limited to the above one. For example, in the first embodiment, the semiconductor integrated circuit 20 and/or the switch 51 may be arranged on the main surface 91b. Specifically, the module substrate 91 may have the main surfaces 91a and 91b opposed to each other. The duplexer 61, the transmission-reception filter 62, the duplexer 63, the transmission-reception filter 64, and the power amplifiers 11 and 12 may be arranged on the main surface 91a, and the switches 51, 53, and 55, the low noise amplifiers 21 and 22, and the multiple external connection terminals 150 may be arranged on the main surface 91b. In this case, post electrodes and/or bump electrodes may be used as the multiple external connection terminals 150. With this configuration, since the components are capable of being arranged on both surfaces of the module substrate 91, it is possible to realize the reduction in size of the radio-frequency module 1. The switch 52 and/or 54 may be arranged on either of the main surfaces 91a and 91b.

Although the diplexer 65 or the triplexer 65A is used in the above embodiments, the configuration is not limited to this. For example, a multiplexer including four or more filters may be used, instead of the diplexer 65 or the triplexer 65A.

Although the radio-frequency module includes both the transmission path and the reception path in each embodiment described above, the radio-frequency module may include only one of the transmission path and the reception path.

INDUSTRIAL APPLICABILITY

The present disclosure is widely applicable to a communication device, such as a mobile phone, as the radio-frequency module arranged in a front-end unit.

REFERENCE SIGNS LIST 1, 1A radio-frequency module
2, 2A, 2B antenna
3 RFIC
4 BBIC
5A, 5B communication apparatus
11, 12, 13 power amplifier
20 semiconductor integrated circuit
21, 22, 23 low noise amplifier
51, 51A, 52, 53, 54, 55, 56, 57 switch
61, 63, 66, 67 duplexer
61R, 63R, 66R, 67R reception filter
61T, 63T, 66T, 67T transmission filter
62, 64 transmission-reception filter
65 diplexer
65A triplexer
91 module substrate
91a, 91b main surface
92 resin member
95 shield electrode layer
101, 102, 103, 104, 105, 106, 107 antenna connection terminal
111, 112, 113 radio-frequency input terminal
121, 122, 123 radio-frequency output terminal
150 external connection terminal
511, 512, 513, 514, 515, 516, 517, 518, 519, 521, 522, 523, 524, 531, 532, 533, 541, 542, 543, 544, 551, 552, 553, 561, 562, 563, 571, 572, 573 terminal
651, 652, 653 filter
d1, d2, d11, d12, d13, d14, d21, d22, d23, d24 distance

The invention claimed is:

1. A radio-frequency module comprising:
a first filter having a passband comprising frequencies of a first communication band group;
a second filter having a passband comprising frequencies of a second communication band group different from the first communication band group;
a third filter having a passband comprising frequencies of a first communication band included in the first communication band group;
a fourth filter having a passband comprising frequencies of a second communication band, which is included in the first communication band group and which is different from the first communication band;
a fifth filter having a passband comprising frequencies of a third communication band included in the second communication band group;
a sixth filter having a passband comprising frequencies of a fourth communication band, which is included in the second communication band group and which is different from the third communication band;
a switch connected to the third filter, the fourth filter, the fifth filter, and the sixth filter;
a plurality of external connection terminals; and
a module substrate having the first filter, the second filter, the third filter, the fourth filter, the fifth filter, the sixth filter, the switch, and the plurality of external connection terminals arranged thereon,
wherein the plurality of external connection terminals comprises:
a first external connection terminal connected to a first end of the first filter and a first end of the second filter,
a second external connection terminal connected to a second end of the first filter,
a third external connection terminal connected to a second end of the second filter,
a fourth external connection terminal connected to the third filter and the fourth filter via the switch, and
a fifth external connection terminal connected to the fifth filter and the sixth filter via the switch.

2. The radio-frequency module according to claim 1, wherein the second external connection terminal and the fourth external connection terminal are juxtaposed with each other on the same main surface of the module substrate, and
wherein the third external connection terminal and the fifth external connection terminal are juxtaposed with each other on the same main surface of the module substrate.

3. The radio-frequency module according to claim 1, wherein the plurality of external connection terminals further comprises a ground terminal that is at ground potential and that is arranged between the second external connection terminal and the third external connection terminal.

4. The radio-frequency module according to claim 1, wherein the plurality of external connection terminals further comprises a ground terminal that is at ground potential and that is arranged between the fourth external connection terminal and the fifth external connection terminal.

5. The radio-frequency module according to claim 1, wherein the plurality of external connection terminals further comprises a ground terminal that is at ground potential and that is arranged between the first external connection terminal and the second external connection terminal.

6. The radio-frequency module according to claim 1, wherein the plurality of external connection terminals further comprises a ground terminal that is at ground potential and that is arranged between the first external connection terminal and the third external connection terminal.

7. The radio-frequency module according to claim 1,
wherein the plurality of external connection terminals further comprises a sixth external connection terminal configured to externally output a radio-frequency reception signal,
wherein a distance between the first external connection terminal and the second external connection terminal is shorter than a distance between the second external connection terminal and the sixth external connection terminal, and
wherein a distance between the first external connection terminal and the third external connection terminal is shorter than a distance between the third external connection terminal and the sixth external connection terminal.

8. The radio-frequency module according to claim 1,
wherein the plurality of external connection terminals further comprises a seventh external connection terminal configured to receive an externally input radio-frequency transmission signal,
wherein a distance between the first external connection terminal and the second external connection terminal is shorter than a distance between the second external connection terminal and the seventh external connection terminal, and
wherein a distance between the first external connection terminal and the third external connection terminal is shorter than a distance between the third external connection terminal and the seventh external connection terminal.

9. The radio-frequency module according to claim 1, further comprising:
a seventh filter having a passband comprising frequencies of a third communication band group, which is different from the first communication band group and the second communication band group;
an eighth filter having a passband comprising frequencies of a fifth communication band included in the third communication band group; and
a ninth filter having a passband comprising frequencies of a sixth communication band, which is included in the third communication band group and which is different from the fifth communication band,
wherein the switch is further connected to the eighth filter and the ninth filter,
wherein the first external connection terminal is further connected to a first end of the seventh filter, and
wherein the plurality of external connection terminals further comprises:
an eighth external connection terminal connected to a second end of the seventh filter, and
a ninth external connection terminal connected to the eighth filter and the ninth filter via the switch.

10. The radio-frequency module according to claim 9, wherein the eighth external connection terminal and the ninth external connection terminal are juxtaposed with each other on the same main surface of the module substrate.

11. The radio-frequency module according to claim 1, wherein the first communication band group has a frequency range that is higher than or equal to 2,300 MHz and that is lower than 2,690 MHz.

12. The radio-frequency module according to claim 11, wherein the first communication band comprises Band7 for Long Term Evolution or band n7 for 5th Generation New Radio.

13. The radio-frequency module according to claim 11, wherein the second communication band comprises Band41 or Band40 for Long Term Evolution, or band n41 or band n40 for 5th Generation New Radio.

14. The radio-frequency module according to claim 1, wherein the second communication band group has a frequency range that is higher than or equal to 1,427 MHz and that is lower than 2,200 MHz.

15. The radio-frequency module according to claim 14, wherein the third communication band comprises Band1, Band25, Band3, or Band66 for Long Term Evolution, or band n1, band n25, band n3, or band n66 for 5th Generation New Radio.

16. The radio-frequency module according to claim 14, wherein the fourth communication band comprises Band34 or Band39 for Long Term Evolution, or band n34 or band n39 for 5th Generation New Radio.

17. The radio-frequency module according to claim 9, wherein the third communication band group has a frequency range that is higher than or equal to 698 MHz and that is lower than 960 MHz.

18. A communication apparatus comprising:
a signal processing circuit configured to process a radio-frequency signal; and
the radio-frequency module according to claim 1, configured to transmit the radio-frequency signal between the signal processing circuit and at least one antenna.

19. The communication apparatus according to claim 18,
wherein the first external connection terminal is connected to the at least one antenna,
wherein the second external connection terminal is short-circuited from the fourth external connection terminal, and
wherein the third external connection terminal is short-circuited from the fifth external connection terminal.

20. The communication apparatus according to claim 18,
wherein the at least one antenna comprises a first antenna and a second antenna,
wherein the fourth external connection terminal is connected to the first antenna, and
wherein the fifth external connection terminal is connected to the second antenna.

* * * * *